United States Patent [19]

Bilow

[11] 4,369,297

[45] Jan. 18, 1983

[54] DIETHYNYLBENZENE-ETHYNYLPYRENE COPOLYMERS

[75] Inventor: Norman Bilow, Encino, Calif.

[73] Assignee: The United States of America as represented by the Secretary of the Air Force, Washington, D.C.

[21] Appl. No.: 307,345

[22] Filed: Sep. 30, 1981

Related U.S. Application Data

[62] Division of Ser. No. 207,829, Nov. 17, 1980, Pat. No. 4,324,830.

[51] Int. Cl.$^3$ ............................................. C08F 238/00
[52] U.S. Cl. ...................................... 526/284; 428/257; 428/260; 428/408; 523/179; 524/66
[58] Field of Search .......................................... 526/284

[56] References Cited

U.S. PATENT DOCUMENTS

| | | |
|---|---|---|
| 3,705,131 | 12/1972 | Korshak et al. ................ 260/47 UA |
| 3,926,897 | 12/1975 | Cessna, Jr. ...................... 260/32.8 R |
| 3,926,907 | 12/1975 | Engle ................................ 260/45.7 P |
| 3,993,711 | 11/1976 | Watson ................................... 260/874 |

*Primary Examiner*—Stanford M. Levin
*Attorney, Agent, or Firm*—Donald J. Singer; William J. O'Brien

[57] ABSTRACT

A high char yielding matrix resin for use in fabricating carbon-carbon composites comprised of a polymerizable mixture of a diethynylbenzene monomer and an ethynylpyrene monomer.

7 Claims, No Drawings

DIETHYNYLBENZENE-ETHYNYLPYRENE COPOLYMERS

STATEMENT OF GOVERNMENT INTEREST

The invention described herein may be manufactured and used by or for the Government for governmental purposes without the payment of any royalty thereon.

This is a division of application Ser. No. 207,829, filed Nov. 17, 1980 now U.S. Pat. No. 4,324,830.

BACKGROUND OF THE INVENTION

This invention relates to aromatic acetylene compounds and their utilization as ablative materials for re-entry vehicles. In a more particular aspect, this invention relates to the synthesis of diethynylbenzene-ethynylpyrene copolymers and their use as high char yielding matrix resins for carbon-carbon composites.

The increased use and interest in the operation of re-entry vehicles has generated a considerable research effort in an attempt to develop structural materials that exhibit high strength and resistance to the stresses and strains encountered by space vehicles during their re-entry regime. Rocket and missile components, such as turbine blades, nozzles, vanes, partitions, and especially nose cones, are very vulnerable to the stress and strain encountered during their re-entry environment. These components require structural materials capable of surviving those stresses and the elevated temperatures occurring during re-entry.

Graphite carbon, in the form of a carbon-carbon composite, using pitch as a resinous matrix, has been found to be useful in fabricating structural components. These materials possess many of the characteristics required by structural elements subjected to the stress of a high temperature re-entry environment. The carbon-carbon materials have proven to be especially effective for nose tip applications and show good thermal stress performance. Unfortunately, these materials often times do not show sufficient mechanical strength, disclose unpredicted anomalies in their ablation characteristics, and require expensive, high pressure processing techniques.

With the present invention, however, it has been found that carbon-carbon composites having superior re-entry characteristics can be produced simply and easily by utilizing a novel aromatic acetylene copolymer as a high char yielding matrix resin for the carbon-carbon composite in lieu of the previously used pitch. The novel copolymer matrix resin is derived by effecting the copolymerization of a mixture of diethynylbenzene and ethynylpyrene.

The reaction mechanism does not require high pressure processing parameters and the resulting copolymer chars easily when utilized as a matrix impregnant for graphite fibers. It easily wets the graphite fibers and penetrates into the pores of the fibers.

The present invention replaces the ill defined, variable composition pitches utilized heretofore as an impregnant and matrix resin for the carbon-carbon composites produced heretofore. The pitches are invariably contaminated with S, O, N, P, ash, and other materials. In addition, the pitch is not homopolymerizable, therefore, it can exude from the impregnated woven carbon composites during processing and, by virtue of the fact that it is not comprised strictly of aromatic hydrocarbon, has a lower carbon content than the material of the instant invention. As a consequence, pitch has a much lower char yield. The instant invention provides processing simplification far beyond the current state of the art pitch and provides more dependable performance characteristics for the carbon-carbon composite products derived therefrom.

SUMMARY OF THE INVENTION

The present invention concerns itself with the synthesis of a novel aromatic acetylene copolymer derived from a mixture of diethynylbenzene and ethynylpyrene and its use as a matrix resin for carbon-carbon composites. The copolymers are unique in that they char very efficiently in yields as high as 95%. Additionally, the chars are capable of graphitizing when heated to temperatures of 2400°–2800° C. The prepolymer mixtures are very fluid when melted and, consequently, they can readily impregnate a woven carbon fiber fabric. In addition, they homopolymerize when heated above 100° C. and, with a sufficient proportion of ethynylpyrene, the homopolymerization rate can be controlled, and runaway reactions can be prevented. The novelty of this invention resides in the fact that it provides a material system which yields high char, graphitizable, low viscosity, easy to process matrix resins for carbon-carbon composites. The composites are especially effective for use as re-entry missile nose cones. The copolymer of the present invention has all the properties necessary to easily produce high density carbons with minimal pressure requirements for fabrication.

Accordingly, the primary object is to provide an easily processable matrix resin for carbon-carbon components.

Another object of this invention is to provide a carbon-carbon matrix resin precursor of specific and known composition which can replace currently used pitch which has an undefined and never reproducible composition.

Still another object of this invention is to provide a carbon-carbon matrix resin precursor which can be processed at pressures below 500 psi, thus eliminating the need for high pressures in the range of 15,000 psi.

A further object of this invention is to provide a carbon-carbon matrix resin precursor which can cure without runaway exotherms.

Still a further object of this invention is to provide a carbon-carbon matrix resin precursor which graphitizes efficiently into high density graphite.

A still further object of this invention is to provide a low melting (120° C.) carbon-carbon matrix resin precursor.

A still further object of this invention is to provide a carbon-carbon matrix resin precursor which has a sufficiently low vapor pressure such as to allow it to be processed without excessive loss due to evaporation.

A still further object of this invention is to provide a low viscosity, carbon-carbon matrix resin precursor which can effectively wet carbon and graphite fibers and fabrics and which can efficiently penetrate into the pores of the fibers.

The above and still further objects and advantages of the present invention will become more readily apparent upon consideration of the following detailed description of its preferred embodiments.

DESCRIPTION OF THE PREFERRED EMBODIMENTS

In accordance with this invention, it has been found that the above-defined objects can be accomplished by synthesizing novel polyaromatic acetylene copolymers derived by effecting a reaction between diethynylbenzene and ethynylpyrene to produce a novel copolymer which can be effectively utilized as a high char yielding carbon-carbon matrix resin precursor. The matrix resin precursor of this invention replaces the variable composition pitches utilized heretofore as a carbon-carbon matrix resin. In the prior art, pitch is procured by trade name. However, its composition varies from batch to batch since it is a mixture of an innumerable number of naturally occurring compounds. It is never pure, and contains undesirable elements of N, S, O, P and ash. In the present state of the art, pitch is used to impregnate woven carbon/carbon fabrics at pressures up to 15,000 psi. The impregnated masses are then carbonized under pressure followed by graphitization up to 2700° C. Subsequently, they are reprocessed about 10 times until maximum densification is achieved. The necessary repetitious processing results in a very high cost product even though the pitch component is very inexpensive. Furthermore, contaminants such as S, O, N, P and ash cause the composite's erosion rates to be inconsistent.

The disadvantages of using pitch as a matrix resin, however, are overcome by the present invention. Specifically, the invention is a mixture of two compounds whose structures are shown below.

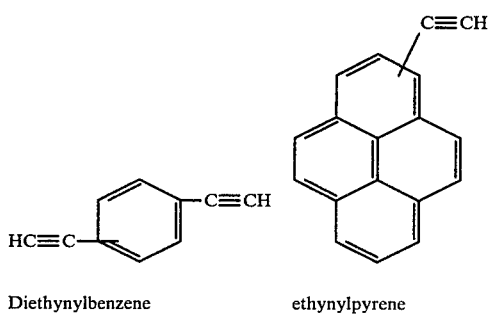

Diethynylbenzene        ethynylpyrene

By itself diethynylbenzene is too volatile, and polymerizes too rapidly to permit its use in the fabrication of carbon-carbon composites. In addition, its char is very difficult to graphitize even when heated to 2700° C. However, it has two excellent advantages, in that the meta isomer is a fluid, and it produces a 94–95% yield of char when pyrolyzed.

In contrast, ethynylpyrene is an excellent graphite former, but produces a lower char yield (45%) at atmospheric pressure. Its char yield can, however, be increased significantly if it is charred under pressure (up to 75–80% at 300 psi). Another advantage is its much slower thermal polymerization rate and another disadvantage is the fact that it is a solid melting in the range of 120° C.

With the present invention, however, it has been found that a copolymer synthesized from a polymerizable mixture of diethynylbenzene and ethynylpyrene has all of the advantages and none of the disadvantages. The mixture polymerizes at a controllable rate at temperatures in the range of 120° C., they char very efficiently (over 85%) after polymerization, and the chars graphitize efficiently in the 2300°–2800° C. temperature range. In addition, the mixture has a low melting temperature e.g., 60°–80° C. It is also fluid enough to allow it to penetrate deeply into the pores and intersticies of woven carbon-carbon fabrics. The mixture, thus, has a major advantage over the use of pitch or even the individual benzene and pyrene monomers as matrix resin components.

Generally, it is preferred to use diethynylbenzene: ethynylpyrene weight ratios between 1:4 and 1:1, respectively. However, for some applications other ratios may prove to be preferable. Thus, ratios of 1:9 and 9:1 constitute the range of ratios which have been found useful for the purposes of this invention.

In utilizing the materials of this invention, the mixture of monomers is prepared and melted together to provide maximum homogeneity. It is then impregnated into a degassed woven carbon/carbon fabric. While maintaining the pressure between 100 and 500 psi and heating at about 100°–130° C. for 4–72 hours, polymerization is promoted. While maintaining the pressure, the composites are heated above 500° C. to promote carbonization. Graphitization can then be promoted using conventional state-of-the-art graphitization conditions.

Different synthesis procedures were used in the preparation of the ethynylated aromatic hydrocarbons of this invention. These procedures are illustrated in Table I in general form. In many cases, two or three methods were used before the preferred method was identified. Method A was used only for the synthesis of meta- and para-diethynylbenzene (DEB) from a mixture of divinylbenzene isomers, even though DEB isomers were also produced successfully by the Vilsmeier process (Method B).

The polymerization of ethynylated aromatic hydrocarbons tends to proceed quite rapidly at or above 160°–180° C., but runaway reactions can also occur at even lower temperatures due to the liberated heat of reaction. Nevertheless, controlled polymerizations can be achieved at temperatures between 100°–150° C. For example, controlled polymerization of a 50:50 mixture of 1-ethynylpyrene and diethynylbenzene has also been achieved at 125° C. and a high quality 3D carbon-carbon composite was produced. At these lower temperatures, where polymerization is slow, pressure is required to prevent monomer evaporation.

Synthesis of small quantities of ethynylpyrene (EP) by the Method C was successfully repeated several times. Subsequently, 1 kilogram was prepared. This latter material melted at a slightly lower temperature (102°–108° C. versus 109°–113° C.), but its infrared spectrum indicated that it was identical to the original material. The difference in melting range is attributed to a slightly different concentration of isomers, probably due to a difference in solvents (nitrobenzene vs. methylene chloride) used in the synthesis. The 1 kilogram lot was used for carbon-carbon composite fabrication purposes.

TABLE I
METHOD A

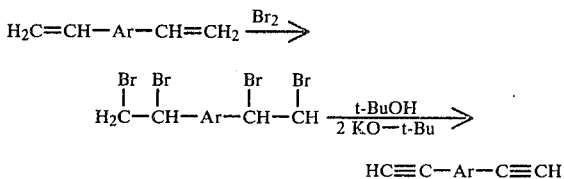

TABLE I-continued

METHOD B

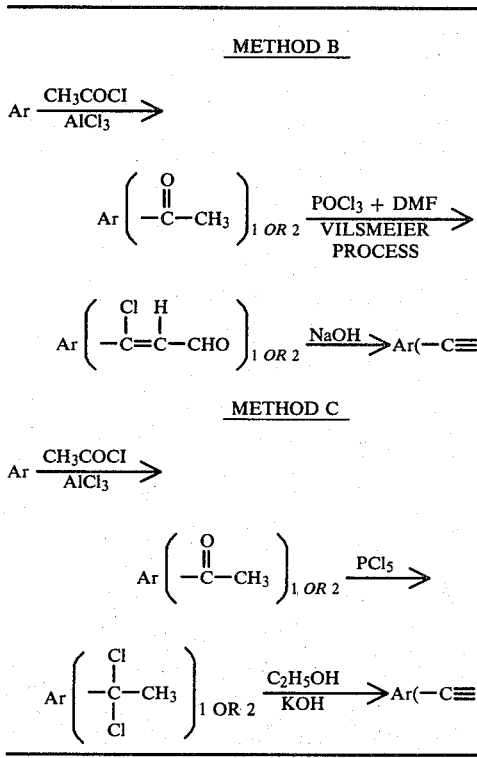

METHOD C

In a typical diethynylbenzene-ethynylpyrene blend, thermally induced copolymerization occurs, initially producing polymers such as the following:

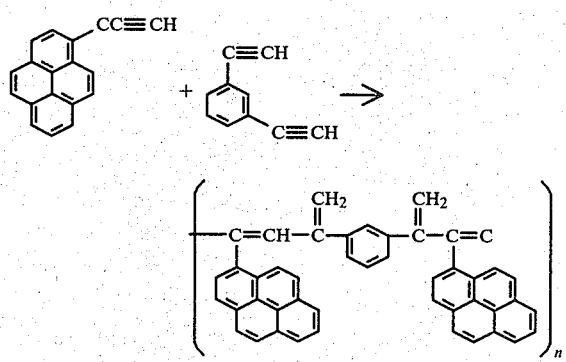

Subsequently, the polymerization will proceed to yield an infinite network of crosslinked resin. The char yield of such a copolymer is dependent upon the pressure at which charring was performed. It was found that a 125 psi char yield curve is approximately 28 percent higher than an ambient pressure char yield curve when the same are compared. Char yields were measured by thermogravimetric analysis on the polymerized blends of the ethynylated compounds. Rates of heating affected these yields to some extent, but not significantly so.

For comparison purposes, char yields were also measured on several coal tar pitches obtained from Ashland Oil Company. Yields at 800° C. are shown after pyrolysis in nitrogen. The values are shown in Table II. None of the pitches were outstanding char formers at ambient pressure. The one yielding 52 percent char was very high melting.

TABLE II

| Pitch | Char |
|---|---|
| RD-131-R (low sulfur No. 240) | 22% |
| RD-130-R (No. 260) | 30% |
| RD-129-R (No. 240) | 30% |
| RD-132-R (No.210C) | 52% |
| RD-128-R (No. 170) | 13% |

TABLE III

CHAR YIELDS OF VARIOUS A-15 PITCH BLENDS CONTAINING POLMERIZABLE ADDITIVE

| Additive | Additive Concentration, % | DTBP, % | Char Yield at 80° C., % |
|---|---|---|---|
| Diethynylbenzene | 20 | | 50–84 |
| | 33 | | 63 |
| | 50 | | 84–88 |
| Divinylbenzene | 100 | | 12 |
| | 20 | | 59 |
| | 33 | 3 | 61 |
| Phenylacetylene | 100 | | 2 |
| | 100 | | 6 after 215° C. post-cure |
| Diethynylbiphenyl | 50 | | 81 |

Other char yield measurements were made on A-15 pitch blends containing additives such as diethynylbenzene, divinylbenzene, phenylacetylene and diethynylbiphenyl. In one case, ditertiary butyl peroxide was added to catalyze polymerization. The blends studied are shown in Table III.

Carbon-carbon materials utilizing the resin matrix precursor of this invention were prepared as unidentified components. They were graphitized, and their microstructure studied with a scanning electron microscope (SEM). The unidirectional composites were prepared by vacuum-pressure impregnating yarn bundles wrapped in a simple graphite fixture. These components were prepared in accordance with the following schedule:

1. Wind dry yarn bundles on graphite fixture.
2. Vacuum-pressure impregnation with matrix pressure.
3. Polymerize the matrix at low temperature and pressure (usually ambient atmospheric pressure and 120°–200° C.).
4. Graphitization to 2700° C.

Table IV lists the unidirectional specimens prepared and examined. In the examination procedure, small composite segments were cut from the mandrel and prepared using standard metallographic techniques. The polished specimens were then oxygen plasma-etched, and examined at magnifications from 20X to 10,000X. Graphitization, or lack of it, was apparent in high magnification photomicrographs of the oxygen plasma etched specimens; these studies were relied on to define graphitizability. In some instances, a polymer would graphitize in the vicinity of fibers while not developing graphitic structure a few fiber diameters away from the interface. These studies verified the conditions of the graphitic or nongraphitic matrix in matrix pockets and in fiber bundles. DEB, EP and mixtures of the two were chosen for fabrication of test billets. Table V shows the processing steps for the pure compounds and mixture of EP and DEB.

An objective of this invention was predicated on improved carbon being obtained under mild processing conditions. The selection of EP and DEB was compatible with this objective. DEP and EP have carbon to hydrogen ratios which are higher than those of most organic compounds. Experimental values have been obtained for comparison (Table VI). Since yield will depend upon experimental conditions, temperatures and pressures at which the data were obtained are included. Commonly, more than 95% of the weight loss occurs below 850° C. Most of the information presented was obtained in two-step processing in which case the product yield fractions for each step gives the overall yield of that material to the indicated temperature.

TABLE IV

UNIDIRECTIONAL COMPOSITES

| Specimen Number | Material | Ultimate Cure Temp °C. | State of Polymerized Mass (as received) | State of Graphitized Mass |
|---|---|---|---|---|
| 1 | Unidirectional composite with 1-ethynylpyrene matrix | 300 | Coherent composite structure | Coherent |
| 2 | Unidirectional composite 20% 1,3-diethynylbenzene in 1-ethynylpyrene | 300 | Coherent composite structure | Generally coherent, some delamination (melting or depolymerization occurred during graphitization processing) |
| 3 | Unidirectional composite 20% 1,3-diethynylbenzene in 1-ethynylpyrene matrix (pressure cured) | 300 | Coherent composite structure | Coherent |

TABLE V

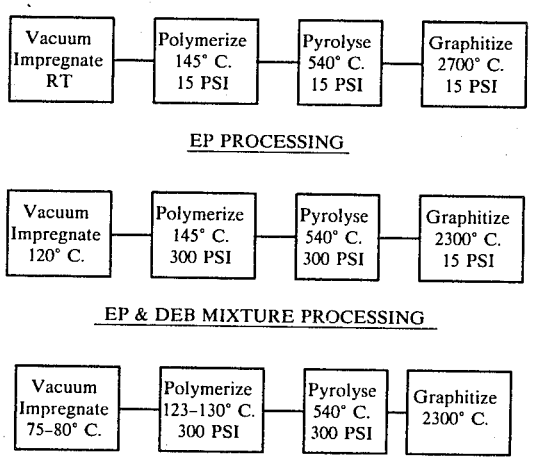

DEB PROCESSING

EP PROCESSING

EP & DEB MIXTURE PROCESSING

TABLE VI

CARBON YIELDS OF 1,3-DIETHYNYLBENZENE (DEB) AND 1-ETHYNYLPYRENE (EP): THEORETICAL AND EXPERIMENTAL

| | Theoretical | Experimental | Processing Conditions Temp. °C. | Pressure (psi) |
|---|---|---|---|---|
| DEB | 95.2 | 94% | 2700 | 15 |
| EP | 95.6 | 44% | 300 | 75 |
| 20% DEB: 80% EP | 95.5 | 76% | 850 | 75 |
| 33% DEB: 67% EP | 95.4 | 89% | 850 | 125 |

TABLE VII

CARBON GRAPHITE YIELD VERSUS PYROLYSIS PRESSURE FOR 15-V PITCH ($T_F = 2700°$ C.)

| Pressure (psi) | Yield (%) |
|---|---|
| 15 | 24 |
| 300 | 65 |
| 920 | 82 |
| 5,000 | 82 |
| 15,000 | 80-84 |

For example, the 20DEB; 80EP mixture was first cured at 75 psi and 300° with a 96.1% yield: then the resulting polymer was heated to 850° C. at 75 psi with a 79% yield for that process. The product of those yield figures gave the tabulated value of 75% (850° C., 75 psi). For comparison, Table VII is included to show the state of pitch processing technology for Allied Chemical 15V pitch. The mechanism of decomposition is very important both with pitch and with these candidate precursor materials. With DEB, little or no gas evolution was observed during polymerization and a high overall carbon yield was obtained with low pressure processing. With pure EP this is not the case; low pressure char was very porous, the polymerization process apparently entrapping bubbles of gases evolved during the polymerization reaction. Ambient pressure cure gave a low yield. EP resembles pitch in this characteristic. Mixtures of EP and DEB gave yields of about 80% carbon at 300 psi or lower while 900 psi pressure is required to achieve that percentage yield with pitch. It is concluded that most improvement of yield in a mixture occurs by adding 40 or 50 weight percent of DEB to EP.

The compounds of this invention polymerize into a char precursor graphitizable at low temperature. This feature determines the nature of the matrix pocket microstructure of the composite, and results in a material similar in structure to high pressure processed pitch carbon/carbon. Experience shows this microstructure to have better performance characteristics in erosion resistance and ablation as well as better basic mechanical and thermal properties which relate to that performance.

DEB's major disadvantage, when used alone as a matrix precursor is the requirement for critical temperature control during polymerization. The larger the mass of material being processed, the more difficult it becomes to control the polymerization, especially when using a constant temperature process. Inside a preform, this may not be as great a problem as with the excess of liquid puddled on top of a preform, as was required in these experiments, to assure complete impregnation of the composite. High vapor pressure and an associated low boiling point make processing difficult, both as the pure compound and in a mixture. To maintain a given composition, time becomes critical; time of application of vacuum is held to a minimum, and hard vacuum is avoided.

EP when used alone, has some advantages: it shows only a very small or nonexistent exotherm in its polymerization, and it is easily graphitized. Temperature control would be less of a problem if the pure compound could be processed. The graphitizability which carries over into its use in a mixture makes it useful in matrix formation. Its normal state as a solid at room temperature complicates processing by requiring elevated temperature impregnation. The melting point of 115° C. is not inordinately high, but does limit its working temperature range. Unfortunately, it has a comparatively low carbon yield and yields porous char.

The DEB-EP mixtures of this invention, however, have been selected because of an apparent synergism which results in: (1) a reduced exotherm; (2) greater ease of graphitization; (3) improved carbon yield relative to EP alone, and dense char similar to that of DEB (and associated absence of gas evolution); and finally, (4) polymerization to a set microstructural framework within matrix pockets. The matrix material fortunately inherits the good characteristics of both components while minimizing the disadvantage of the pure compounds. The solubility of EP in DEB, increasing with increasing temperature, allows a reasonable working range for impregnation with their mixture (70°–100° C.). Table V shows the processing steps for the pure compounds and a mixture of EP and DEB.

Further studies to determine the effectiveness of the precursor material of this invention were carried out using 3-dimensional PAN minibillets (1 cm cylinders) of PAN fibers cut from a larger 3-D preform.

These minibillets are identified as specimens 22, 23 and 24. Reaction temperature limits were investigated by processing in a modified DIA apparatus in order to program the long, closely controlled temperature cycles required for curing and pyrolyzing to 700° or 300° C. Samples of these billets were checked for weight pickup in single cycle and multiple cycle processing. The required scale-up to larger equipment and larger amounts of precursor material was done by adapting a United States autoclave which had vacuum to 300 psi pressure, capability as well as reasonable temperature control. To maintain closer temperature control, samples were processed within containers which are inserted into cavities within a large graphite block. This large mass was needed for its thermal inertia to eliminate temperature cycling. Chromelalumel thermocouples inserted into two positions within the block indicated that constant and controllable temperature was maintained within ±1° C. over periods of 16 or more hours in the most recent processing cycles.

Two one-inch cubes (specimens 25 and 26) cut from the same PAN 3-D preform were partially processed in this fashion. The processing proceeded as depicted in the flow diagram of Table VIII. Water immersion measurements, conducted by ASTM procedure C20-46, were used to monitor processing and to determine the amount of precursor required to fill the billet in the following cycle. An excessive amount of matrix precursor is undesirable because of the potential problem of a runaway reaction during polymerization. In each cycle the billets were processed in a close fitting steel container conserving expensive experimental materials and minimizing the potential for exotherm. Processing details and billet characteristics are shown in Table IX. With the first minibillet, specimen 25, pure DEB was used as the matrix precursor. The second, specimen 26, was processed with a 50:50 weight percent mixture of DEB and EP. ASTM C-20 data were not obtained for each step of the processing of this billet but the bulk density curve for densification appeared to be reasonably good considering the exotherm experienced in cycle 1 of the densification. Analysis based on data available showed that because of the closed porosity developed in the first and second cycles, this point represents a 90–100 percent efficiency in filling of the available (open) pore space.

Difficulties with DEB processing, and the consideration discussed above, led to the use of the mixture of compounds used with billet 26. This billet processed reasonably well, but the density curve and porosity data show that if continued on the same basis as the first four cycles, it probably would not fully densify. The reason for this has been observed in the nature of the char which developed. Gas evolution, which apparently occurs during polymerization of the EP component when it is a large fraction of the total mixture, causes the char to have low density and some closed porosity. This may have resulted from evaporation of the DEB component of the mixture because of two factors: the large open volume of the autoclave and the vacuum processing of the DEB component with its high vapor pressure.

TABLE VIII

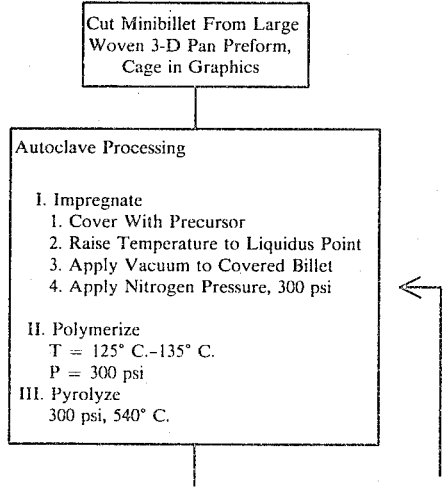

TABLE VIII-continued

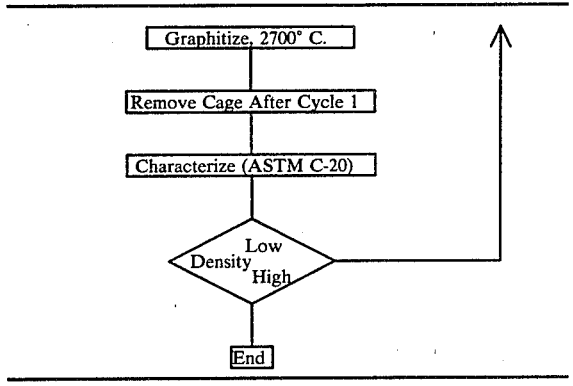

TABLE IX

3-D BILLETS PREPARED DURING PROCESS DEVELOPMENT

| Specimen No. | Type | Size | Matrix Precursor | No. of Cycles | Graphitization Temperature (°C.) |
|---|---|---|---|---|---|
| 22 | 3-D PAN | 1 cm cylinder | DEB | 2 | 2600 (fast heat ramp, no hold at $T_{gr}$) |
| 23 | 3-D PAN | 1 cm cylinder | 2 EP:1 DEB | 1 | 2600 (slow heat ramp, ½ hr hold at $T_{gr}$) |
| 24 | 3-D PAN | 1 cm cylinder | DEB | 1 | 2600 (slow heat rame, ½ hr hold at $T_{gr}$) |
| 25* | 3-D PAN | 1 × 1 × 1 in. cube | DEB | 2 | 2600 |
| 26 | 3-D PAN | 1 × 1 × 1 in. cube | 1 EP:1 DEB | 4 | 27,00 2300 |
| 27* | 3-D PAN | 2 × 2 × 3 in. | 1 EP:1 DEB | 2 | 2700 |

*A preliminary pyrolysis was at too high a temperature and resulting in an exotherm witout any apparent damage to the billet.

The process development work on chars of pure compounds, unidirectional minibillets, and small 3D composites were carried out to prepare for fabrication of a modest sized billet which would be cut into test specimens (mechanical, erosion, ablation) to obtain data for comparison with data on carbon-carbon materials processed by standard methods such as HiPIC EISP processes for missile nosetips. The 2 in.×2 in.×3 in. billet Specimen 27 provided sufficient material for characterization. The larger size of this billet necessarily involved further scale-up in the use of matrix precursor. In the first impregnation-polymerization cycle, the temperature program which proved satisfactory for 1 inch cubes was not suitable for the larger billet as processed. The reaction ran away, as the temperature of the chamber reached 135° C., resulting in a low density porous char. The apparent reason for the runaway reaction is that with the larger mass of liquid precursor the exothermic heat developed on polymerization was not conducted away through the liquid fast enough to prevent a continually increasing temperature. To avoid the exotherm, either (1) polymerization must be accomplished at a low temperature for a longer time, or (2) the amount of excess monomer used must be reduced. The former conditions were used for the second impregnation of billet 27. The temperature of polymerization, previously 135°–145° C. for small billets, was reduced to 123° C.

To summarize the present invention, it has been found that a new low pressure impregnated and carbonized carbon/carbon composite can be produced from a mixture of high char yielding acetylenic precursor materials; namely, a copolymerizable mixture of 1,3-diethynylbenzene and ethynylpyrene. Processing methods have been developed which allow densification to 1.8 g/cm³. The partial polymerization step is done at low pressure and low temperature (300 psi, 123° C.) over a period of about 16 hours. The material is comparable to HiPIC densified carbon/carbons in microstructure, mechanical properties, (except shear) and thermal expansion. The advantages of this material are: HiPIC-like microstructure from a low pressure process; thermomechanical properties comparable to HiPIC composites; reproducible matrix material composition (synthetic precursor of low impurity content, therefore, multisource acquisition and improved quality control are possible); reduction in processing cycles from other LoPIC processing to achieve comparable density (high char yield); and potential for development of much larger composites because of low pressure processibility.

While the invention has been described with particularity in reference to specific embodiments thereof, it is to be understood that the disclosure of the present invention is for the purpose of illustration only and is not intended to limit the invention in any way, the scope of which is defined by the appended claims.

What is claimed is:

1. A homogeneously compounded composition comprising a resinous copolymer of diethynylbenzene and ethynylpyrene.

2. A composition in accordance with claim 1 wherein said diethynylbenzene and said ethynylpyrene are present in a monomer weight ratio of between about 1:9 to 9:1.

3. A composition in accordance with claim 1 wherein said diethynylbenzene and said ethynylpyrene are present in a monomer weight ratio of between about 1:4 to 1:1.

4. A composition in accordance with claim 1 wherein said diethynylbenzene and said ethynylpyrene are present in a monomer weight ratio of about 1:1.

5. A process for synthesizing an aromatic acetylene copolymeric compound which comprises the steps of (1) forming a mixture of diethynylbenzene and ethynylpyrene; (2) heating said mixture to a temperature within the range of about 120° to 140° C. at a pressure of about 300 psi; (3) continuing to heat said mixture under pressure for a period of time sufficient to effect the copolymerization of said mixture; and (4) separating the resulting reaction product.

6. A process in accordance with claim 5 wherein said mixture is heated to a temperature of from about 123° to about 130° C. at a pressure of 300 psi.

7. A process in accordance with claim 5 wherein said mixture is heated to a temperature of 123° C. at a pressure of 300 psi for a period of about 16 hours.

* * * * *